United States Patent [19]
de Keller

[11] Patent Number: 6,062,563
[45] Date of Patent: *May 16, 2000

[54] CASINO GAME

[76] Inventor: David Guy de Keller, Sweet Valley Farm, Soetvlei Ave., Constantia 7800, Cape Town, South Africa

[*] Notice: This patent issued on a continued prosecution application filed under 37 CFR 1.53(d), and is subject to the twenty year patent term provisions of 35 U.S.C. 154(a)(2).

[21] Appl. No.: 08/526,288

[22] Filed: Sep. 11, 1995

[51] Int. Cl.[7] .................................................. A63F 1/00
[52] U.S. Cl. ............................................. 273/274; 273/146
[58] Field of Search .................................. 273/146, 274, 273/292

[56] References Cited

U.S. PATENT DOCUMENTS

| | | | |
|---|---|---|---|
| 4,948,134 | 8/1990 | Suttle et al. | 273/274 |
| 5,013,049 | 5/1991 | Tomaszewski | 273/292 |
| 5,257,810 | 11/1993 | Schorr et al. | 273/274 |
| 5,556,101 | 9/1996 | Jabro | 273/274 |
| 5,597,162 | 1/1997 | Franklin | 273/274 |
| 5,630,586 | 5/1997 | Lowden | 273/274 |
| 5,649,705 | 7/1997 | String | 273/274 |

*Primary Examiner*—William M. Pierce
*Attorney, Agent, or Firm*—Philip J. Anderson; Quirk & Tratos

[57] ABSTRACT

Game apparatus comprising a playing surface 1 layout 1*a* and a random result generator comprising either two or more dice or a single deck of convential playing cards, said layout being marked out with various designated betting areas 2–5 (some of which specify the pay-offs) for the reception of players' chips. The layout has a grid configuration constituted by betting areas labelled Banker 3 and Player 4 which represent an Even money wager and a betting area 5 depicting a horseshoe and a column of poker hands/rankings. In addition an area marked Insurance represents a third wager with solid circles/spots for the reception of players' chips. In the preferred embodiment of the game the dice are characterized by indicia in the form of spots representing the numerals 1–6 and two sets of five dice are utilized, one set by the dealer/Banker and one set by the shooter/Player.

9 Claims, 3 Drawing Sheets

Five poker dice

Exploded drawing of poker die to show positions of symbols 6,062,563

CASINO GAME

The present invention relates generally to the field of games of chance and amusement. More particularly, this invention relates to dice games and betting layouts and tables, such as dice game apparatus found in casinos.

BACKGROUND OF THE INVENTION

Gaming boards utilising dice as the random result selector originated in the mists of time. Evidence exists which shows that the Sumerians played such games c 3000 B.C. Game boards using six dice, pyramidal in shape, were unearthed in the Royal tombs of Ur c 3000 B.C. and archaeologists have discovered six sided dice used by the Etruscans dating back to c 2000 B.C. (Ref: Board and Table Games from Many Civilizations by R. C. Bell, Dover Publications, Inc. New York) Dice appear to have been universally used by major cultures through-out recorded history. (Ref: Hoyle's Rules of Games).

Despite the fact that the principle of using dice and a board game to constitute a game of chance is well established, room exists for the improvement of such games and for devising new layout designs coupled with the modification of conventional structures of play. This principle is accepted by the U.S. Patent & Trademark Office and is exemplified by the granting of Patents to: Monek U.S. Pat. No. 3,826,498, Jul. 30, 1974; Berman U.S. Pat. No. 4,902,019 Feb. 20, 1990; Page U.S. Pat. No. 5,133,559 Jul. 28, 1992.

In modern casinos, particularly in the U.S.A., the principle dice game to be found is known as Craps which is played with two dice and the game is characterised by betting options where the result of the rolled dice is not dependant on one roll of the dice but a series of throws of the dice. Craps became popular in America in the 1800's and is believed to have evolved from the European dice game Hazard. Craps had it's heyday amongst American Servicemen during the two world wars. Today Craps is literally a dying game studies undertaken by major casinos have established that the age of the average Craps player exceeds sixty. The younger generation of players who frequent casinos shy away from the game because, the method of play is complicated and the language used on the layout is baffling to novices.

Straddle Poker Dice is a game designed to fullfill a need i.e. a casino dice game that is both exciting to play and easy to understand. The game of Poker is played in casinos using conventional playing cards. The game of poker dice is played in bars and domestic homes, generally for small stakes, and where players play against one another, and not as a casino game where players play against the House. Poker dice is played with dice with indicia representing traditional symbols e.g. Ace, King, Queen, Jack and the numeral ten and nine or alternatively dice bearing indicia of numerals 1–6 or dice bearing spots to represent the numerals 1–6. The game Straddle Poker Dice, based on one roll of the dice, is essentially a mixture of the principles found in the casino games of Baccarat and Poker, but with improvements and innovations consisting of different structures and betting combinations not found in either Baccarat or Poker. The principal objective of the present invention is to provide a gaming layout arrangement and set of structures and rules of play which effectively blends the old and the new in casino gaming whereby a game is produced which is easy to operate and which is easy for players to understand.

In Straddle provision is made for up to nine players to participate seated at a blackjack style table. The layout may also be fitted on an oval, square or rectangular style table. Each player plays with chips of a separate colour. The pay-offs are not the true mathematical odds: the House enjoys a small advantage/edge. See Tables A & B.

Straddle will, because of it's similarities to poker, poker being the most popular private game in the U.S.A., attract instant play. Many visitors to casinos are poker players but many are intimidated from playing 'live' poker' in casinos, perhaps the main reason being the perception that they would be competing with 'near professionals'. Straddle will attract this type of player because the game is not a game between players but a game against the House.

In the past table games have generated a larger volume of money wagered than slot machines. The picture has changed in recent years and today slot machines account for a higher revenue than traditional table games. This situation has arisen for a number of reasons. Innovation in design and technology have made slot machines aesthetically more exciting; video slot machines are now in operation; the 'jackpot element' in slots has grown into mammoth payouts. As a consequence of the above situation casino owners are today very receptive to the introduction of new but sound table games in the hope of reviving the aura and excitement of 'live' gaming. Straddle Poker Dice is a game designed to achieve the above objective.

Various other objects and advantages of the present invention will become clear from the detailed description of an exemplary embodiment thereof and the novel features will be particularly apparent in the accompanying drawings in conjunction with the appended claims.

DISCLOSURE OF THE INVENTION

This invention relates to apparatus for playing a game of chance. The present invention provides apparatus comprising a playing surface/layout (cloth, table top or game board) and a random result selector consisting of two or more dice per shaker of which there are two. The dice when rolled/tumbled have an equal chance of selecting any one from a number of results; the layout being marked out with a series of designated betting areas for the reception of players' chips and where some betting areas specify the pay-off odds.

In playing the game, named STRADDLE POKER DICE, using apparatus according to the present invention, each player bets on the results determined by the dice. The game offers players the choice of making three separate wagers. Two wagers, the even money bet and the insurance bet, are determined by the sum totals (numeric value) of the numbered dice rolled/tumbled by both the dealer and a player. The third wager is determined solely by the result of the dice rolled/tumbled by the player. The play/procedure entails the dealer placing his dice of a specific colour in a shaker and tumbling the dice on the playing surface. One player will place an equal number of dice of a different colour in a shaker and do likewise. A conventional rotable dice cage may be used—the cage is turned upside down in order to create a random result. The shaker may be in the form of a sealed translucent domed or cylindrical cup which is either manually or electronically operated.

The dice utilised in the invention are characterised by the numerals 1–6 imprinted on the faces/surfaces of each die, alternatively traditional poker dice bearing indicia found on conventional playing cards, namely an Ace, King, Queen, Jack and the numerals ten and nine are used. In the preferred embodiment of the invention the dice used are conventional six sided dice bearing spots to represent numerals 1–6.

A BRIEF SUMMARY OF THE GAME AND THE METHOD OF PLAY

Straddle is a game embracing the principles of the genus of games known as baccarat (a symmetrical wager) and the principles inherent in the game of poker and poker dice. The game is confined to one roll of the dice. Two or more dice may be used in playing the game but in the preferred version five dice are used by both the dealer and the player.

BET 1

The dealer rolls five dice and one player, the shooter, rolls five dice. A shooter will continue rolling the dice per each round of betting until such time as he loses his individual bet on the even money wager. Thereafter the rolling of the dice rotates amongst the players on the same basis.

The roll with the highest numerical value of the sum total of the dice wins. If traditional poker dice are used the roll with the highest poker hand wins. Players may wager on either the shooter's dice—box marked PLAYER or the dealer's dice—box marked BANKER. Winners are paid EVEN money. All ties, in the case of numbered dice, (both totals being identical) are a push/standoff (players neither win or lose) bar 17 when players forfeit their bets. The above rule governing ties many vary and casinos can select whichever structure or rule suits them according to the choices illustrated in Table A.

Players may insure against a tie of 17 (or whatever rule governing ties is selected by the House). Players are wagering that a specific event occurs and in the above example that the sum total of the dealer's five dice is 17 and that likewise the sum total of the shooter's dice will number 17.

BET 2

Players wager that on the shooter's roll (the dealer's dice are not taken into account) one of the ranks of poker illustrated on the layout will occur. Table B.

Other features and advantages of the invention will become apparent from the more detailed description, taken in conjunction with the accompanying drawings, which illustrate, by way of example the principles of the invention.

DESCRIPTION OF THE DRAWINGS

A preferred gaming table/layout in accordance with the present invention will now be described by way of example with reference to the accompanying diagrammatic drawings in which.

DETAILED DESCRIPTION OF THE INVENTION

Figure 1:
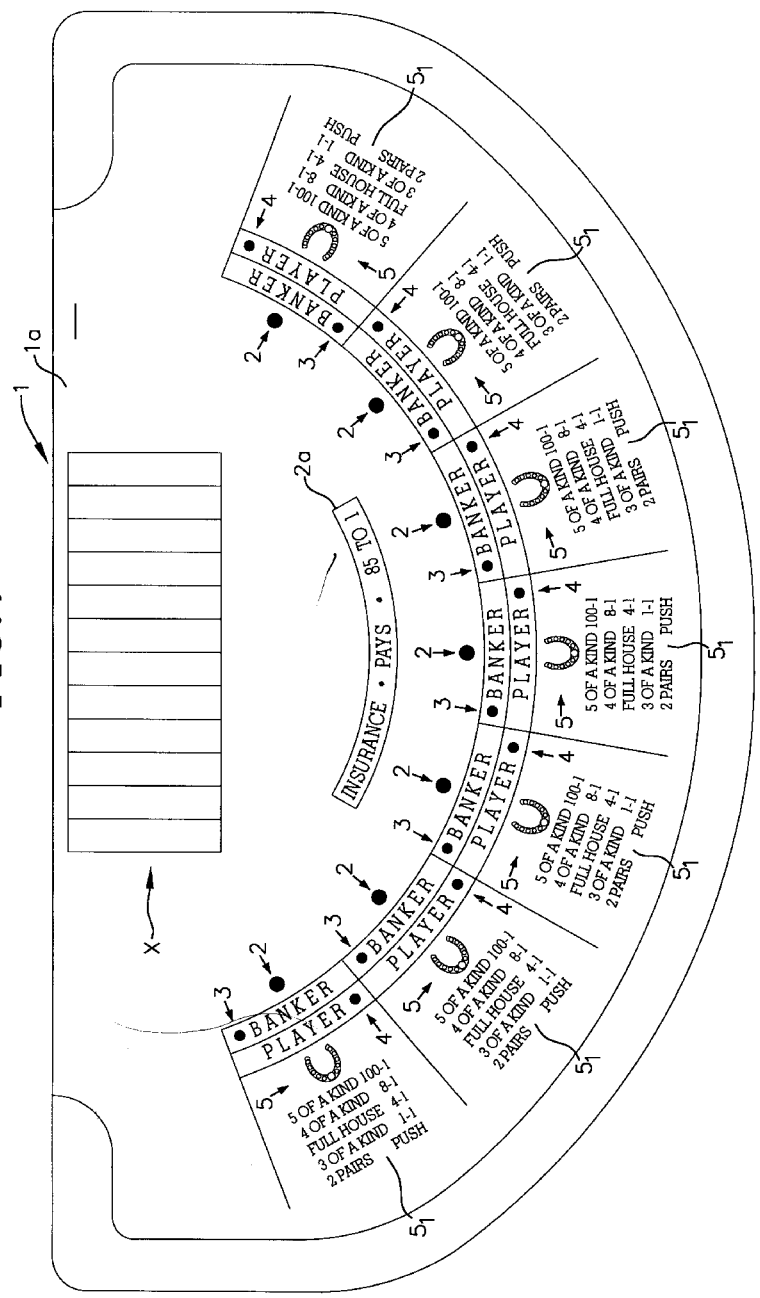
FIG. 1 is a top plan view of the gaming table layout for accommodating wagers with illustrating indicia (a box marked insurance and corresponding solid circles for the placing of chips; a grid system comprising a BANKER box and a PLAYER box each containing solid circles for the reception of chips; an area marked with a symbol of an horseshoe and accompanying poker rankings and corresponding payoffs). The above indicia designate the betting areas coupled in some cases with appropriate pay-offs.
Figure 1:
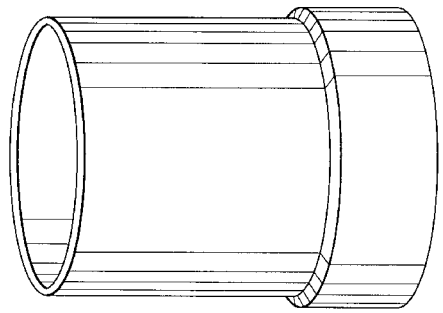
Figure 2:
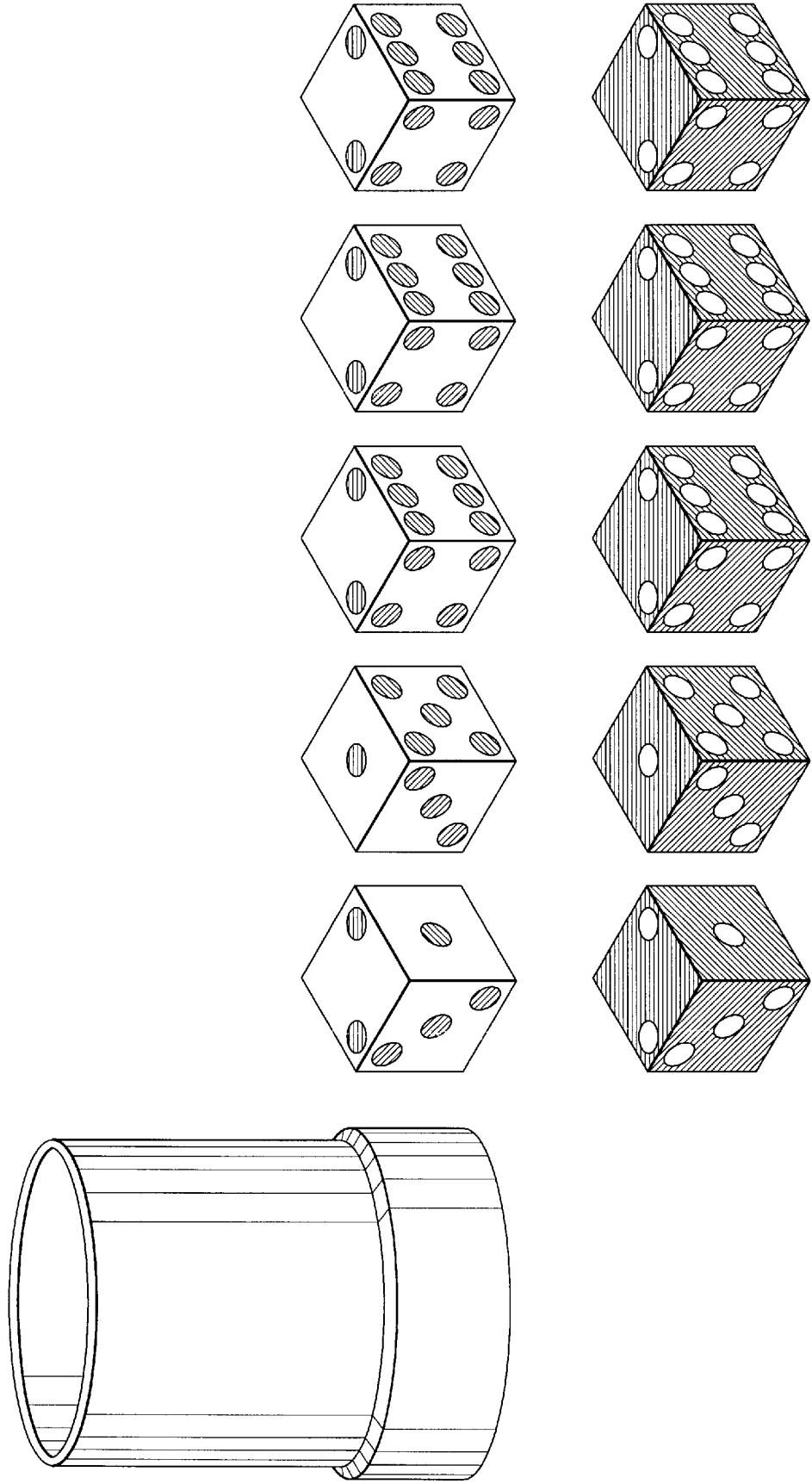
FIG. 2 is a view of the result selector, the dice, and the shaker in linear perspective.
Figure 3:
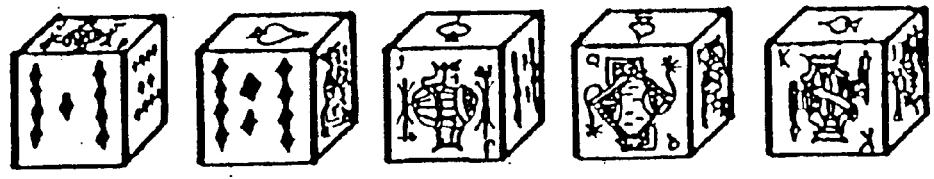
FIG. 3 is a schematic view depicting a set of five dice with the dice shown in an unfolded schematic so that all six faces of each cubicle die can be seen at once. This view illustrates how each die is identified by the use of indicia which are either spots representing numerals 1–6 or symbols as used in traditional poker dice.
Figure 3:
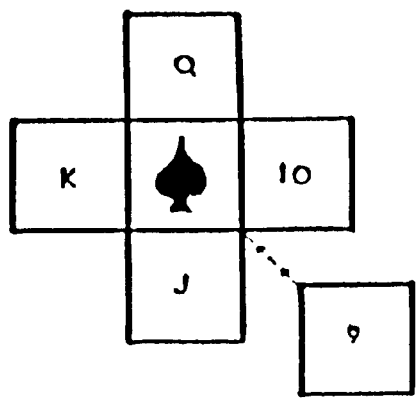
Figure 3:
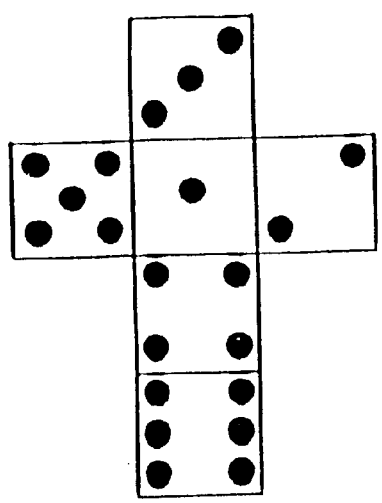

In a preferred embodiment of the present invention a gaming layout is provided having a surface marked out, as illustrated in FIG. 1, together with two shakers each containing five dice, the colours of the first set of dice being one colour and the dice of the second set being a second colour.

Referring to the drawings the table is two legged in a half-moon shape 1 and has a flat playing surface 1a. The area marked X on FIG. 1 ia an area for the housing of chips prior to being used by the players. The layout 1a provides a playing surface marked with indicia to define betting areas (some betting areas specifying the pay-off odds), said betting areas being identified with reference indicia 2–5 in FIG. 1. 2a represents a wager whereby players can wager that the sum total (numeric value) or poker hand of the five dice tumbled by the dealer banker will be equal to the sum total or poker hand constituted by the five dice thrown by the shooter/player. To cover this insurance bet the players place their chips on the area 2 represented by a solid circle. The players win the insurance bet if the identical totals of the two sets of five dice correspond to the total or totals specified in the house rules, for example, the total may be confined to the total 17 or maybe restricted to the total 17 or 18 or any other combination specified in the house rules and contained in Table A.

BET 1. The dealer rolls the dice the result of which applies to wagers on the betting area 3 marked Banker. The shooter rolls his dice the result applying to wagers on the betting area 4 marked Player. The winning wager relates to the roll which shows the highest numerical total or when specified the highest poker hand. Players have the choice of wagering on either the Banker box marked 3 or on the Player box marked 4, in both cases players place their chips on the solid spots within each box. This type of bet is known as a symmetrical bet as in the tossing of a coin where the probabilities of either result occurring are exactly equal.

In playing Straddle players have the option of marking a third wager, namely, that the shooter's/players dice will result in one of the poker rankings listed in ~5. The players signify such a bet by placing their chips on the horseshoe symbol 5. This wager only applies to the dice rolled by the shooter/player and does not apply to the dice tumbled by the dealer. The five poker rankings marked ~5 represent five specific poker 'hands'. The wager is an all embracing one in that the player is wagering that one of the enumerated combinations will occur. The player is paid the corresponding pay-offs relating to the actual poker 'hand' that occurs. 5 of a Kind occurs, if, for example, five threes appeared on the upward faces of the five tumbled dice. If card/poker dice were utilised then 5 of a Kind would occur, if for, example, five Kings appeared on the upward faces of the five rolled dice. 4 of a Kind occurs, if, for example, four threes appeared on the upward faces of the five dice. A Full House is represented by the occurrence of three dice bearing the same indicia, for example, three fives in conjunction with the appearance of, for example, two sixes appearing on the other two dice. 3 of a Kind occurs, for example, if three of the five dice each bear the identical numeral or spots or card symbol on their uppermost faces/surfaces. Three tens, for example, would constitute 3 of a Kind provided the other two dice each bore separate indicia. Likewise Two Pairs would occur, if, two dice each bore the same numeral, spots or card face, for example, two nines and two of the remaining three dice also bore the same but different numeral, spot or card face on their uppermost surfaces, for example, two tens. A push or stand-off represents a situation where the player neither wins additional chips nor loses his wager.

In playing the game players place chips/counters on one to three of the wagers provided. Once all bets have been placed both the dealer and the shooter tumble their respective dice. All closing bets are cleared and winning bets are paid the appropriate odds. The shooter rolling the dice on behalf of all the players continues rolling the dice in each round until such time as he loses his personal wager on the even money bet, namely, the area marked Banker 3 or the area marked Player 4. The throwing of the dice rotates amongst all the players on the same basis.

The dice used in the game have a conventional cubic shape. This cubic configuration provides six flat surfaces or faces, each of equal area, each side displaying indicia thereon. FIG. 4. Each of the die is such that each of the six surfaces of each die has an equal probability of facing upwardly after said dice come to rest following a tumble of the dice. The numeric value to be obtained from each die is read from whichever die surfaces are upwardly directed following a tumble of the dice. The opposite sides of each die, bearing a numeral or spot, when totalled always add up to seven.

The indicia used to indicate the numeral values 1–6 need not be configured as a numeral, rather said numeric value can be indicated by provision of a number of dots on each surface, as is commonly accepted practice. In the game use of dots/spots to assign numeric values to die surfaces is preferred although other indicia capable of representing a numeric value is also suitable for use. Traditional poker dice bearing indicia found in conventional playing cards, for example, an Ace, King, Queen, Jack and the numerals ten and nine can be utilised. FIG. 4. In this instance the highest poker hand, i.e. five aces would determine whether the dice rolled by the dealer/Banker 3 won or whether the dice rolled by the shooter/Player 4 won.

Whereas the preferred embodiment of the game is the one described in the foregoing paragraphs and illustrated in the layout FIG. 1 an alternative version of the game is operable.

The layout would depict the Insurance box 2a and the insurance betting area 2 and the Even bets marked Banker 3 and Player 4 but the all inclusive bet 5 in relation to the listed poker hands would differ. In the alternative version the wager covering various poker hands would differ. In the alternative version the wager covering various poker hands 5~ would not be all-inclusive. Players would have the choice of betting on a variety of specific poker hands. The layout would display various circles that designate different betting areas and squares representing the six faces of a die, each square constituting a separate betting area. In this instance a player would select one or more specific poker hands to wager on, for example, 3 of a Kind or a specific pair and the bets would be separate and independent of one another and not all inclusive as in the preferred version. Whereas in the preferred embodiment of the game dice are employed as the random result generator, conventional playing cards may also be utilised as the random result generator. In this instance the play of the game and the three types of wagers remain the same. The dealer would deal five cards to represent the Banker's hand 3 and would deal five cards to represent the Players hand 4. The highest hand would be based either on the highest poker hand showing or the highest numerical value of the respective hands would be the determining factor. The face value of each card would count and the colour cards representing the Ace, King, Queen and Jack would be assigned numerical values, for example, either the value ten or one. Using cards as the result generator would simply require an adjustment of the payoffs re the Insurance bet 2a and the wager 5a re the poker hands to reflect the mathematical probabilities and the engineered House advantage.

The game board or layout FIG. 1. 1a may be comprised of a substrate such as a sheet of plastic but preferably a cloth such as commonly used in casinos. The present invention comprehends a kit of sorts comprising the playing surface (game board)., dice and shakers and playing cards packaged in a presentation kit and used as a parlour game.

In a sophisticated version of the game the layout 1a could be atop a table containing electronics, a keyboard, and indicator lights for each bet such that the results die could be keyed in by the House and then the electronics within the table automatically tabulate the winning bets and light up the indicator lights corresponding to each bet won by the players. The dice shaker need not be manually operated. The game can be operated whereby the dice are placed in a container, preferably a glass or plastic dome or cylinder, and the dice electronically activated.

Whereas the preferred embodiment of the game is the one described in foregoing paragraphs i.e. a live game, the game can be applied to and played on a machine of the type known as slot or video machine either mechanically and/or electronically operated or where the game is operated by the use of electronic or computer or other technological aids which generate a random result and display such results on a screen.

The game is not confined to or defined by the illustrated odds/pay-offs re specific betting areas. The game can be played by offering pay-offs of a higher or lower order. It will be appreciated that the game can be played whereby the odds payable are the true mathematical odds. In this instance the House could charge a participation fee or levy a charge on players' winnings.

TABLE A

STRADDLE - SUMMARY OF PROBABILITIES AND HOUSE EDGES

PROBABILITIES OF TOTALS BEING TIED - 5 DICE

| TOTAL SCORE | NO. OF WAYS | PROB- ABILITY OF EACH | PROB- ABILITY OF TIES | | |
|---|---|---|---|---|---|
| 5 | 1 | 0.000129 | 0.000000 | | |
| 6 | 5 | 0.000643 | 0.000000 | | |
| 7 | 15 | 0.001929 | 0.000004 | | |
| 8 | 35 | 0.004501 | 0.000020 | | |
| 9 | 70 | 0.009002 | 0.000081 | | |
| 10 | 126 | 0.016204 | 0.000263 | | |
| 11 | 205 | 0.026363 | 0.000695 | | |
| 12 | 305 | 0.039223 | 0.001538 | | |
| 13 | 420 | 0.054012 | 0.002917 | | |
| 14 | 540 | 0.069444 | 0.004823 | | |
| 15 | 651 | 0.083719 | 0.007009 | | |
| 16 | 735 | 0.094522 | 0.008934 | | |
| 17 | 780 | 0.100309 | 0.010062 | | |
| 18 | 780 | 0.100309 | 0.010062 | | |
| 19 | 735 | 0.094522 | 0.008934 | | |
| 20 | 651 | 0.083719 | 0,007009 | | |
| 21 | 540 | 0.069444 | 0.004823 | | |
| 22 | 420 | 0.054012 | 0.002917 | | |
| 23 | 305 | 0.039223 | 0.001538 | | |
| 24 | 205 | 0.026363 | 0.000695 | | |
| 25 | 126 | 0.016204 | 0.000263 | | |
| 26 | 70 | 0.009002 | 0.000081 | | |
| 27 | 35 | 0.004501 | 0.000020 | | |
| 28 | 15 | 0.001929 | 0.000004 | | |
| 29 | 5 | 0.000643 | 0.000000 | | |
| 30 | 1 | 0.000129 | 0.000000 | | |
| | 7776 | 1.000000 | 0.072693 | 7.2693% | 4395456 |
| PROBABILITY DEALER WINS: | | | 0.463654 | 46.3654% | 28035360 |
| PROBABILITY PLAYER WINS: | | | 0.463654 | 46.3654% | 28035360 |
| | | | 1 | 1 | 60466176 |

Player's Expectation: per Unit Stake

| | | | |
|---|---|---|---|
| Win | 1 with prob 0.463654 | | 0.483653 |
| Lose | 1 with prob 0.463654 | | −0.46365 |
| | | | 0 |
| Ties | with prob 0.072693 | | |

Net Expectation and Edge depends purely on rule for ties
ALTERNATIVE TREATMENTS FOR TIES:

A) Surrender portion of stake for all ties -
and offer insurance against all ties

| Portion | HOUSE EDGE | Insurance Odds | House Edge |
|---|---|---|---|
| Half | 3.63% | 12:1 | 5.50% |
| Quarter | 1.81% | | |
| Fifth | 1.45% | | |

OTHER ALTERNATIVES FOR STRADDLE TIES:

B) Individual Ties won by either Dealer or Player - Various Options to give Different House

TABLE A-continued

STRADDLE - SUMMARY OF PROBABILITIES AND HOUSE EDGES (Player Wins all Ties Other than those specified)

| Dealer Wins | Prob | 7.2693% - Prob | HOUSE EDGE |
|---|---|---|---|
| Ties 15–20 | 5.2010% | 2.0683% | 3.13% |
| Ties 14–18 | 4.0889% | 3.1803% | 0.91% |
| Ties 16–20 | 4.5001% | 2.7692% | 1.73% |
| Ties 13–18 | 4.3807% | 2.8886% | 1.49% |
| Ties 14–19 | 4.9824% | 2.2869% | 2.70% |
| Ties 15–19 | 4.5001% | 2.7692% | 1.73% |

C) Individual Ties won by either Dealer or Player, and the rest a Push - Various Options

| Rule for Ties | HOUSE EDGE |
|---|---|
| Player Wins Ties under 16, Dealer Wins Ties 16–19, Rest Push | 2.06% |
| Player Wins Ties under 16, Dealer Wins Ties 16–18, Rest Push | 1.17% |
| Player Wins Ties under 15, Dealer Wins Ties 15–17, Rest Push | 1.57% |
| Player Wins Ties under 14, Dealer Wins Ties 14–16, Rest Push | 1.52% |
| Player Wins Ties under 13, Dealer Wins Ties 13–15, Rest Push | 1.21% |
| Player Wins Ties under 17, Dealer Wins Ties 17–20, Rest Push | 0.98% |
| Player Wins Ties under 17, Dealer Wins Ties 17–21, Rest Push | 1.46% |

Insurance:

For Alternatives B) and C) Insurance can be offered at odds offering a suitable house edge.

D) Straddle 17 Options -

Dealer Wins on Tied 17 only, all other ties a Push

| HOUSE EDGE | Insurance Odds | House Edg |
|---|---|---|
| 1.0062% | 90:1 | 8.44% |
| | 85:1 | 13.47% |

E) Bar 14 and 15 Option -

Dealer wins on Tied 14 and 15 only, other ties a Push

| HOUSE EDGE | Insurance Odds | House Edg |
|---|---|---|
| 1.1831% | 80:1 | 4.17% |
| | 70:1 | 16.00% |
| | 75:1 | 10.08% |

E) Bar 17 and 18 Option -

Dealer wins on Tied 17 and 18 only, other ties a Push

| HOUSE EDGE | Insurance Odds | House Edg |
|---|---|---|
| 2.0124% | 45:1 | 7.43% |
| | 40:1 | 17.49% |
| | 43:1 | 11.46% |
| | 44:1 | 9.44% |

F) House deducts a commission from winning wagers.

TABLE B

STRADDLE - PAYOUT AND ODDS TABLE FOR SECOND BET

| HAND | FREQUENCY | PROBABILITY | CHANCE (ONE IN) | PAYOUT ODDS OF: | TO: | EXPECTED PER UNIT |
|---|---|---|---|---|---|---|
| 5 of a Kind | 6 | 0.00077160 | 1296 | 55 | 1 | 0.0424 |
| 4 of a Kind | 150 | 0.01929012 | 51.84 | 10 | 1 | 0.1929 |
| Full House | 300 | 0.03858025 | 25.92 | 4 | 1 | 0.1543 |
| 3 of a Kind | 1200 | 0.15432099 | 6.48 | 1 | 1 | 0.1543 |
| 2 Pairs | 1800 | 0.23148148 | 4.32 | PUSH | 1 | 0.0000 |
| Others | 4320 | 0.55555556 | 1.80 | | | −0.5556 |
| Totals: | 7776 | 1 | | | | −0.0116 |

HOUSE EDGE: 1.16%

NOTES:

1. Player Does Not Specify Any Particular Hand In Advance
2. Player Receives Payout Odds As Shown For Hand Obtained On First Roll Of The Dice

STRADDLE - VARIOUS OPTIONS FOR SECOND BET

| HAND | | | | | | | | |
|---|---|---|---|---|---|---|---|---|
| 5 of a Kind | 40 | 65 | 90 | 115 | 90 | 60 | 120 | 110 |
| 4 of a Kind | 10 | 9 | 8 | 7 | 10 | 9 | 7 | 7 |
| Full House | 4 | 4 | 4 | 4 | 3 | 4 | 4 | 4 |
| 3 of a Kind | 1 | 1 | 1 | 1 | 1 | 1 | 1 | 1 |
| 2 Pairs | PUSH | PUSH | PUSH | PUSH | PUSH | PUSH | PUSH | PUSH |
| EDGE | 2.31 | 2.31 | 2.31 | 2.31 | 2.31 | 2.7 | 1.93 | 2.7 |

The game is not restricted to the betting areas described. A version of the game can be played without, for example, offering the bet labelled 'Full House' ~5 or where, for example, a bet labelled 'Five 5s' was included in the poker rankings ~5. The game is operable despite the addition or omission of selected betting areas.

Although the present invention has been described in connection with a specific exemplary embodiment thereof in FIG. 1 it will be understood that many adaptions, modifications and variations thereof will be possible. The Tables A & B illustrate the various ways in which:

1) pay-offs may differ in relation to Bet 2—the wager on poker hands on the shooter's roll of the dice
2) rules governing the TIE can differ
3) the pay-off on the Insurance bet can vary Any such modifications or variations found in Tables A & B will not detract from the scope or spirit of the game.

What is claimed is:

1. A method for playing a casino game between a Dealer and a plurality of Players comprising:

each player placing a base wager on a Player hand or a Banker hand and at least one of an insurance wager and an outcome wager;

randomly selecting a plurality of indicia defining an outcome for each of a Banker's hand and a Player's hand, each of said outcomes having a predetermined ranking based upon the indicia combination of each;

resolving the wagers according to the following, (i) the player's base wager by comparing the ranking of the Banker's and Player's hand, the higher ranking hand declared the winner, if said player has wagered upon the winning hand paying the player even money on their wager, if the player has wagered upon the losing hand collecting the player's wager, hands of equal ranking declared a tie and the player's base wager neither paid or collected a tie of a preselected ranking declared a losing outcome whereupon the player's wager is collected, (ii) if the player has made an insurance wager and the hands are a tie of said preselected ranking, paying the player based upon their insurance wager at greater than 2:1, and (iii) if the player has made an outcome wager and the Player hand outcome is one of a schedule of preselected outcome rankings, paying the player.

2. The method of claim 1 where the randomly selecting step includes randomly selecting representations of playing cards for each of said Player's and Dealer's hands, the ranking of each of said hands determined by the of hands ranking according to the rules of Poker.

3. A method for playing a casino game between a Dealer and a plurality of Players comprising:

each player placing a base wager on a Player hand or a Banker hand and at least one of an insurance wager and an outcome wager;

rolling five, six sided, dice to randomly produce a five dice outcome for each of the Dealer's and Player's hands, each of said outcomes having a predetermined ranking based upon the indicia combination of the die;

resolving the wagers according to the following, (i) the player's base wager by comparing the ranking of the Banker's and Player's five dice hand outcomes, the higher ranking hand declared the winner, if said player has wagered upon the winning hand paying the player even money on their wager, if the player has wagered upon the losing hand collecting the player's wager, hands of equal ranking declared a tie and the player's base wager neither paid or collected, ties of a preselected ranking declared a loss whereupon the player's wager is collected, (ii) if the player has made an insurance wager and the hands are of said preselected tie ranking, paying the player based upon their insurance wager at greater than 2:1, otherwise collecting the player's insurance wager, and (iii) if the player has made an outcome wager and the Player hand five dice outcome is one of a schedule of preselected outcome ranking, paying the player at odds greater than 2:1, otherwise collecting the player's outcome wager.

4. The method of claim 3 including rolling five dice wherein each die has numerical representations of the numbers 1–6 on the sides thereof and the ranking is based upon the numerical combination obtained by rolling the dice.

5. The method of claim 3 including rolling dice wherein each die has representations of playing cards on the sides thereof and the ranking is based upon the combination obtained and according to the rules of ranking of hands according to Poker.

6. The method of claim 5 wherein the randomly selecting step includes rolling dice wherein each die has representations of playing cards Ace through 9 on the sides thereof and the ranking is based according to the rules of ranking of hands according to Poker.

7. The method of claim 4 including rolling five die for each of the Player's and the Banker's hands to produce for each hand (i) a total numerical outcome derived as the additive sum of each dies result, the sum defining the ranking for the hands for resolution of the base wager and (ii) an outcome derived from the numerical die combinations for each hand for resolution of the outcome wager.

8. The method of claim 7 wherein the preselected outcome rankings and payoffs are as set forth in Table 1

TABLE 1

| Outcome | Payoff |
|---|---|
| 5 of-a-Kind | 100:1 |
| 4 of-a-Kind | 9-1 |
| Full House (3 of-a-Kind with 2 of-a-Kind) | 4-1 |
| 3 of-a-Kind | 1-1 |
| 2 Pairs | Push |

9. The method of claim 4 wherein the preselected tie ranking is an additive dice sum for the Dealer's and Player's hands of 17.

* * * * *